(12) United States Patent
Gögülter

(10) Patent No.: US 12,083,721 B2
(45) Date of Patent: Sep. 10, 2024

(54) FILLING DEVICE FOR THE JOINT IN ENERGY DISTRIBUTION LINES

(71) Applicant: EAE ELEKTRIK ASANSOR ENDUSTRISI INSAAT SANAYI VE TICARET ANONIM SIRKETI, Istanbul (TR)

(72) Inventor: Hidir Gögülter, Istanbul (TR)

( * ) Notice: Subject to any disclaimer, the term of this patent is extended or adjusted under 35 U.S.C. 154(b) by 319 days.

(21) Appl. No.: 17/635,812

(22) PCT Filed: Oct. 20, 2021

(86) PCT No.: PCT/TR2021/051074
§ 371 (c)(1),
(2) Date: Feb. 16, 2022

(87) PCT Pub. No.: WO2022/098329
PCT Pub. Date: May 12, 2022

(65) Prior Publication Data
US 2022/0371242 A1   Nov. 24, 2022

(30) Foreign Application Priority Data
Nov. 9, 2020   (TR) .................................. 202017882

(51) Int. Cl.
*B29C 45/14*   (2006.01)
*B29C 45/46*   (2006.01)
(Continued)

(52) U.S. Cl.
CPC ........ *B29C 45/14467* (2013.01); *B29C 45/46* (2013.01); *H02B 1/20* (2013.01);
(Continued)

(58) Field of Classification Search
CPC ............... B29C 45/1446; B29C 45/46; B29C 2045/1797; B29C 45/14065;
(Continued)

(56) References Cited

U.S. PATENT DOCUMENTS 3,727,674 A * 4/1973 Chatourel .............. B22D 18/04
164/337
3,925,998 A * 12/1975 LeCorgne ............... E02D 5/385
405/242

(Continued)

FOREIGN PATENT DOCUMENTS

CN   107793703 A   3/2018
CN   108532838 A   9/2018
(Continued)

OTHER PUBLICATIONS

International Search Report for corresponding PCT/TR2021/051074, dated Jan. 20, 2022.
(Continued)

*Primary Examiner* — Nahida Sultana
(74) *Attorney, Agent, or Firm* — Egbert, McDaniel & Swartz, PLLC

(57) ABSTRACT

A filling device for the joint that provides filling of the desired area to be poured in cases where similar electrical transmission systems or components such as low and high voltage busbars and cables are attached to each other.

4 Claims, 1 Drawing Sheet

(51) Int. Cl.
*H02B 1/20* (2006.01)
*B29C 45/17* (2006.01)
*B29L 31/34* (2006.01)

(52) U.S. Cl.
CPC ............... *B29C 2045/1797* (2013.01); *B29L 2031/3462* (2013.01)

(58) Field of Classification Search
CPC .......... B29C 2045/14139; B29C 45/17; B29C 39/10; H02B 1/20; B29L 2031/3462; H02G 5/007; H02G 1/145; H02G 15/08; H02G 5/06; H02G 15/003
See application file for complete search history.

(56) References Cited

U.S. PATENT DOCUMENTS

| | | | | |
|---|---|---|---|---|
| 2002/0185766 A1* | 12/2002 | Daihisa | ................ | B29C 33/16 264/275 |
| 2007/0031210 A1* | 2/2007 | Schmidt | ............. | B29C 45/2622 411/437 |
| 2015/0060464 A1* | 3/2015 | Mann | ....................... | A62C 4/00 220/560.01 |
| 2017/0136530 A1* | 5/2017 | Werner | ................. | B22D 17/30 |
| 2018/0370463 A1 | 12/2018 | Haraguchi et al. | | |
| 2019/0118246 A1* | 4/2019 | Hunter | ................... | B22C 15/24 |
| 2019/0305526 A1 | 10/2019 | Velthuis et al. | | |
| 2022/0062977 A1* | 3/2022 | Tsuji | ..................... | B22D 17/10 |
| 2023/0038351 A1* | 2/2023 | Sieglhuber | ............. | B22D 39/06 |

FOREIGN PATENT DOCUMENTS

| | | |
|---|---|---|
| JP | 2002300787 A | 10/2002 |
| KR | 20150011673 A | 2/2015 |

OTHER PUBLICATIONS

Written Opinion of the International Searching Authority for corresponding PCT/TR2021/051074, dated Jan. 20, 2022.

* cited by examiner

FILLING DEVICE FOR THE JOINT IN ENERGY DISTRIBUTION LINES

TECHNICAL FIELD

The invention relates to a filling device for the joint in energy distribution lines.

In particular, the invention relates to a filling device for the joint that provides filling of the desired area to be poured in cases where similar electrical transmission systems or components such as low and high voltage busbars and cables are attached to each other.

BACKGROUND OF THE INVENTION

Today, modular compact conductors called busbars are used in energy distribution systems. Each conductor, called busbar, is more preferred because it has high current carrying properties.

Energy continuity is essential in a functioning energy distribution system. The mentioned busbar lines consist of more than one module. By adding these modules end-to-end, energy distribution line installation is carried out.

Electric distribution and transportation systems, known as busbars, have a modular structure. Each busbar module is added end-to-end according to the route of the electric line, forming the electric transmission line. Modules are connected to each other by means of apparatus called additional modules.

The busbar additional module connects the conductive bars in the busbar modules to each other electrically and mechanically and ensures the continuation of the line.

Said additional joints must be filled with filling material.

In current applications, the filling material in the form of casting directly from the bucket on the area above the additional connection modules is filled into the said additional connection module.

Filling materials contain chemicals that may be harmful to human health in case of contact. As mentioned, the filling material poured directly on the area with the bucket seriously threatens human health.

In addition, in case of such an application, although it can be ensured that it does not spill out with the help of the personnel, it often spills out of the additional connection module and there is a risk of contamination.

Pouring takes some time to complete. This leads to a prolongation of the assembly process time.

In order to carry out the aforementioned process, the additional connection point is opened from the top and the upper gourd is closed after the filling material is poured. In this case, the IP insulation of the top cover must be done well. This significantly extends the assembly costs and assembly time.

In the literature, in the US patent application numbered US2019305526, "A multi-phase busbar for conducting electric energy includes: a base layer of an insulating material; a first conducting layer of a sheet metal; a first insulating layer of an insulating material arranged on the first conducting layer; a second conducting layer of a sheet metal arranged on the insulating layer; and a second layer of an electrically insulating material which is arranged on the second conducting layer. The first and/or second insulating layers include spacers, each spacer including a layer of a rigid insulating material. At least one of the spacers is glued to an electrically insulating coating of the first and/or second conducting layer, and/or at least one of the spacers is glued to an electrically conductive surface of an uncoated first and/or second conducting layer by an adhesive." statements are included.

In said application, a busbar assembly filled with insulation filler material is disclosed.

Also in the literature, in the US patent application numbered US2018370463, "A circuit assembly includes a circuit board including a control circuit for controlling the flow of electric current in a power circuit is integral with the top of a plate-shaped busbar. The circuit assembly includes a circuit board in which both sides are provided with circuit patterns and having a via hole for electrically connecting the circuit patterns to each other, an adhesive sheet is interposed between the busbar and the circuit board and fixes the circuit board to the top of the busbar, a hole filling resin fills the via hole, and a resist layer is formed on at least a side of the circuit board that faces the busbar, covering the via hole filled with the hole filling resin. The adhesive sheet includes a substrate made of an insulating material, and adhesive layers are formed on both sides of the substrate and are sticky at room temperature." statements are included.

In said application, too, a busbar assembly is disclosed, comprising a resistive layer covering the through-hole filled with filling resin.

Again in the literature, in the Chinese patent application numbered CN107793703, "The invention relates to a novel modified epoxy resin cast busbar and a preparation method thereof. The novel modified epoxy resin cast busbar is made from epoxy resin, a curing agent, a toughener, an accelerant, a filling material, a colorant, a release agent and the like. By using novel modified resin to prepare busbar cast insulating materials, higher anticorrosion, fireproof, waterproof and anti-explosion properties can be achieved, and normal electrical properties of a bus system can also be satisfied." statements are included.

In said application, the epoxy resin casting busbar and a method of preparation thereof are disclosed.

Due to the reasons mentioned above, a new filling device was needed for the joint in the energy distribution lines.

PURPOSE OF THE INVENTION

Starting from this position of the technique, the aim of the invention is to introduce a new filling device for the joint in energy distribution lines that eliminates the existing disadvantages.

Another aim of the invention is to present a structure that cuts off the contact of harmful chemical materials formed during casting with humans.

Another aim of the invention is to present a structure that minimizes the risk of spill and contamination to the environment.

Another aim of the invention is to provide a structure that increases the casting speed and reduces the site assembly time.

Another aim of the invention is to present a structure in which the upper part of the casting area does not need to be open and thus the IP properties of the product are strengthened.

REFERENCE NUMBERS

A—Filling Device
1. Casting Chamber
2. Thruster Structure
    2.1 Inlet Cover
    2.2 Driving and Thrusting Shaft
    2.3 Protective Sleeve
    2.4 Outlet Cover
3. Transmission Hose
4. Additional Casting Area

DETAILED DESCRIPTION OF THE INVENTION

In this detailed explanation, the innovation that is the subject of the invention is only explained with examples that will not have any limiting effect for a better understanding of the subject.

The invention is a filling device (A) for the joint that provides filling of the additional casting area (4), which is the area where casting is desired, in cases where similar electrical transmission systems or components such as low and high voltage busbars and cables are attached to each other; characterized in that, comprises; casting chamber (1), positioned as a holding area for pressure before transfer of the material prepared for casting, thruster structure (2) that accelerates the said casting process, the transmission hose (3), which allows the pressurized transfer of the material prepared for casting, additional casting area (4) created in the annex section of the said energy distribution lines, where the material required for IP is transferred via the said transmission hose (3).

Figure 1:
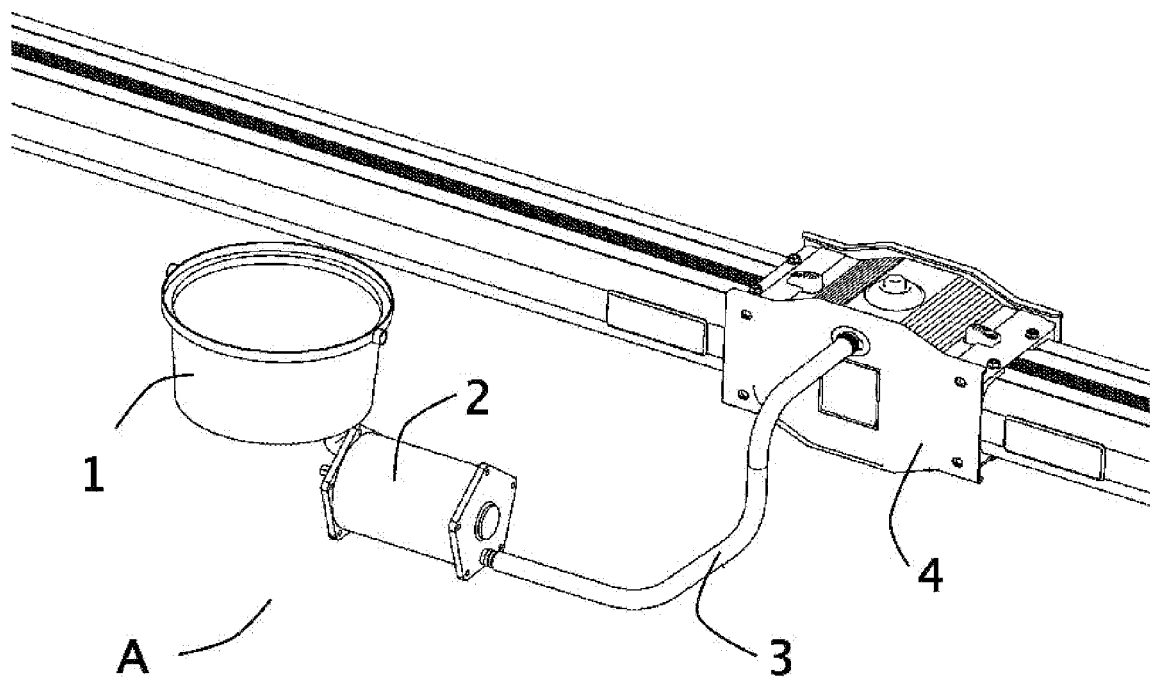
FIG. 1 A representative view of the filling device for the joint in the energy distribution lines, which is the subject of the invention FIG. 2 Side view of the thruster structure in the filling device for the joint in the energy distribution lines, which is the subject of the invention

FIG. 1 shows a representative view of the filling device (A) for the joint in the energy distribution lines, which is the subject of the invention.

Figure 2:
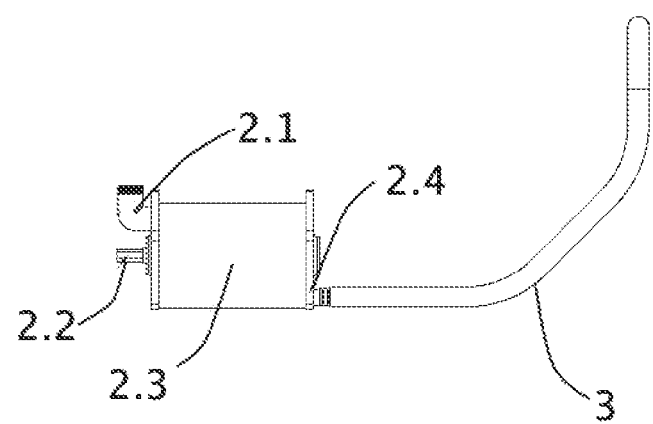

FIG. 2 shows a side view of the thruster structure (2) in the filling device (A) for the joint in the energy distribution lines, which is the subject of the invention.

The filling device (A) according to invention consists main parts of, casting chamber (1), positioned as a holding area for pressure before transfer of the material prepared for casting, thruster structure (2) that accelerates the said casting process, the transmission hose (3), which allows the pressurized transfer of the material prepared for casting, additional casting area (4) created in the annex section of the said energy distribution lines, where the material required for IP is transferred via the said transmission hose (3).

The aforementioned thruster structure (2), on the other hand, consists of the main parts of the inlet cover (2.1) that enables the material prepared for casting to be transferred into the said thruster structure (2), the driving and thrusting shaft (2.2) that ensures the transfer of the said material by pushing it to the said transmission hose (3), the protective sleeve (2.3) that forms the main body as the shell, used for the safe guiding of the material, and the outlet cover (2.4), which ensures that there is no leakage during the thruster structure (2) of the said material and passes into the transmission hose (3) and determines the direction of the material to go.

The user who wants to transfer the filling material to the additional casting area (4) located in the said busbar additional connection area, first fills the filling material into the said casting chamber (1).

The material prepared for casting passing from the said casting chamber (1) to the thruster structure (2) is located in the protective sleeve (2.3) that forms the main body of the thruster structure (2). Said driving and thrusting shaft (2.2) transfers the said material firstly to the outlet cover (2.4) and then to the transmission hose (3) from there.

Said transmission hose (3) also ensures that the material is filled into the additional casting area (4). Thus, the user can perform the filling process without touching the aforementioned material.

The invention claimed is:

1. A filling device for a joint that provides a filling of a casting area in which busbars are attached to each other, the filling device comprising:
    a casting chamber positioned as a holding area for masting material prior to transfer of the casting material;
    a thruster structure communicating with said casting chamber so as to apply a pressure to the casting material received from said casting chamber;
    a transmission hose connected to thruster structure, said thruster structure urging the casting material into and through said transmission hose; and
    a casting area formed in an annex section for energy distribution lines, said casting area communicating with said transmission hose so as to receive the casting material therein as required for ingress protection for the annex section for energy distribution lines; and
    an inlet cover positioned on said thruster structure and adapted to allow the casting material from said casting chamber to pass therethrough and into said thruster structure such that an upper part of said casting chamber can be closed.

2. The filling device of claim 1, wherein said thruster structure has a driving and thrusting shaft, the driving and thrusting shaft urging the casting material into said transmission hose.

3. The filling device of claim 1, wherein said thruster structure has a protective sleeve extending therearound.

4. The filling device of claim 3, wherein said thruster structure has an outlet cover adjacent said transmission hose, said outlet cover in leakproof relation to the protective sleeve, said transmission hose being connected to an outlet of said outlet cover.

* * * * *